April 22, 1924.
J. W. WIGINTON
HITCH
Filed Oct. 28, 1922
1,491,650
2 Sheets-Sheet 1
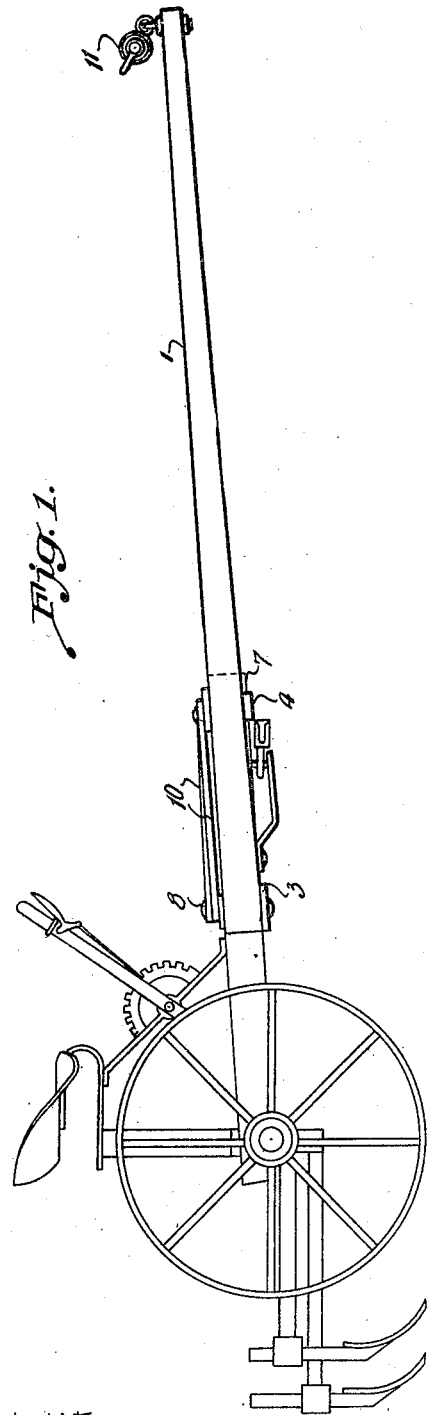
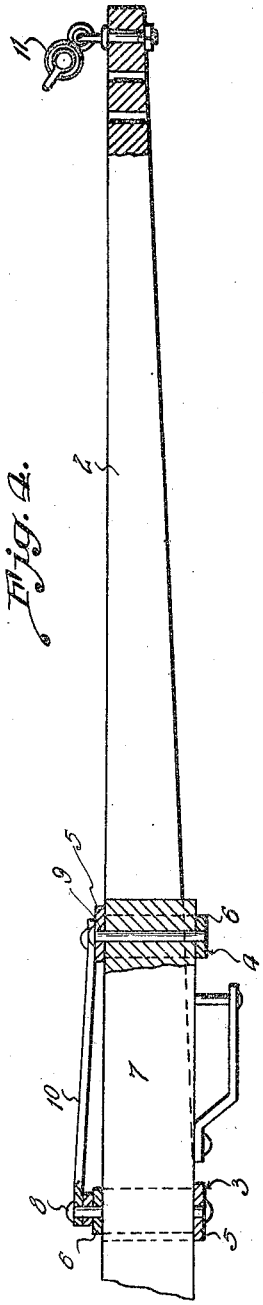

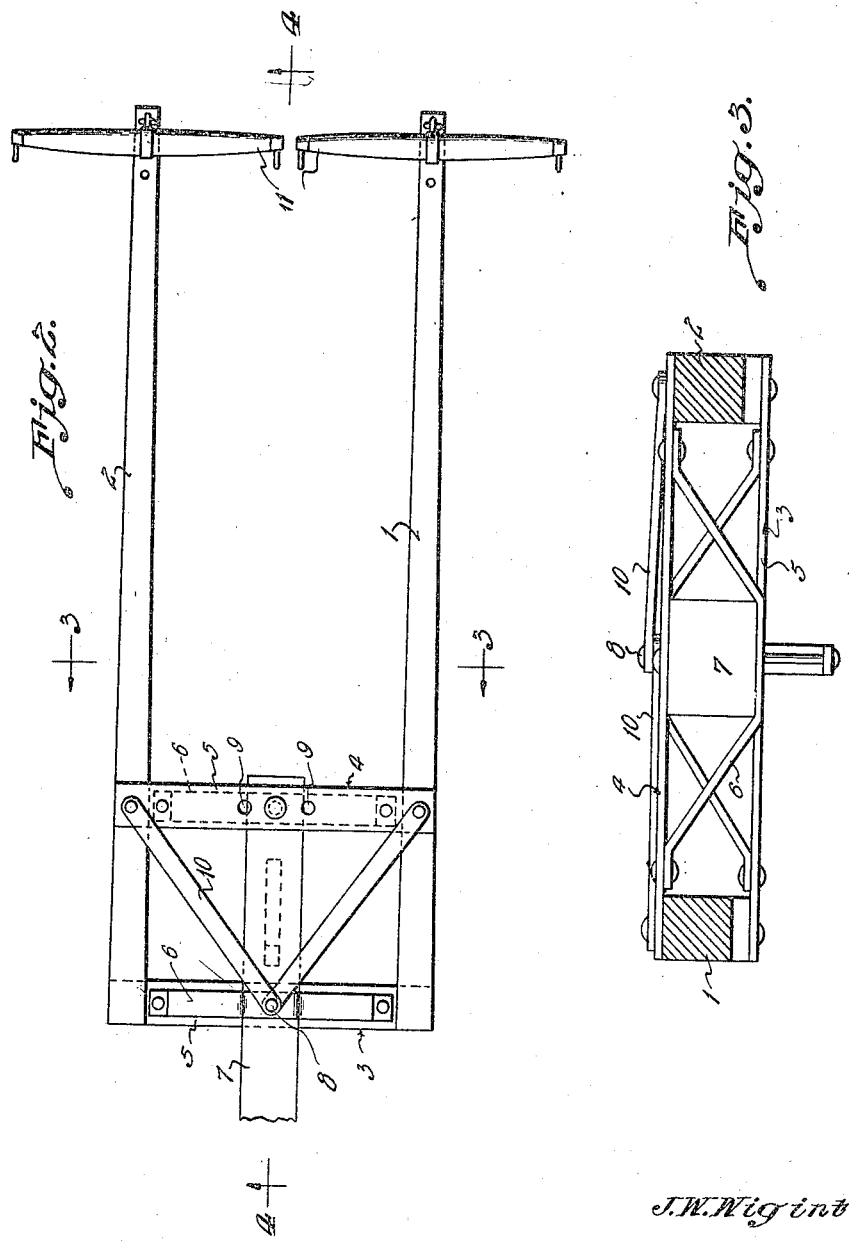

Patented Apr. 22, 1924.

1,491,650

UNITED STATES PATENT OFFICE.

JOHN W. WIGINTON, OF BROWNWOOD, TEXAS.

HITCH.

Application filed October 28, 1922. Serial No. 597,596.

*To all whom it may concern:*

Be it known that I, JOHN W. WIGINTON, a citizen of the United States, residing at Brownwood, in the county of Brown and State of Texas, have invented new and useful Improvements in Hitches, of which the following is a specification.

This invention relates to a three-horse hitch for implements, the general object of the invention being to provide a pair of tongues spaced apart to receive one of the horses between them with means for adjustably connecting the tongues to the implement.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation showing the invention attached to a wheeled plow.

Figure 2 is a plan view.

Figure 3 is a section on line 3—3 of Figure 2.

Figure 4 is a section on line 4—4 of Figure 2.

In these views 1 and 2 indicate a pair of tongues which are spaced apart to receive a horse between them. These tongues are connected together at the rear ends by the braces 3 and 4, each brace consisting of a flat piece 5 which has its ends connected with the tongues and a piece 6 which has its ends flaring outwardly and connected with the piece 5. The center of the piece 6 is flat. The stub tongue 7, connected with the implement, fits in the space between the pieces 5 and 6 of each brace and is bolted or otherwise fastened to the braces, as shown at 8. The front brace is provided with a number of holes 9 for receiving the bolt so that the stub tongue can be adjusted in said brace so that the plow can be made to run to either the right or the left. The braces are connected together by the inclined brace strips 10. The neck yokes 11 are connected with the ends of the tongues in the usual manner.

An implement provided with this three-horse hitch is free from side draft and three horses can pull any sweep or lister that might be required on a planter. It can be attached to any implement that requires a tongue and the hitch can be adjusted to work as close to the plow as it is safe for the horses feet. Thus the plow will be easier on the horses. Any ordinary three-horse evener can be used on the device and it pulls from the beam or tongue the same as any two or four horse evener.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A hitch of the class described comprising a pair of tongues spaced apart to receive a horse between them, braces connecting the tongues together, each brace consisting of a cross piece having its ends connected with the tongues and a second piece having flaring ends connected with the cross piece, said pieces forming spaces for receiving the stub tongue of an implement between them, means for pivotally connecting the rear brace to the stub tongue and means for adjustably connecting the front brace to the said tongue.

In testimony whereof I affix my signature.

JOHN W. WIGINTON.